United States Patent [19]
Pillan et al.

[11] Patent Number: 5,483,556
[45] Date of Patent: Jan. 9, 1996

[54] DATA COMPRESSION-DECOMPRESSION METHOD AND APPARATUS FOR SYNCHRONOUS TERMINAL MEANS

[75] Inventors: Philippe Pillan; Georges Baudoin, both of Paris, France

[73] Assignee: SAT (Société Anonyme de Télécommunications), Paris, France

[21] Appl. No.: 111,535

[22] Filed: Aug. 25, 1993

[30] Foreign Application Priority Data

Aug. 27, 1992 [FR] France .................................. 92 10328

[51] Int. Cl.$^6$ .................................................. H04B 1/66
[52] U.S. Cl. ......................... 375/340; 375/222; 455/54.1; 370/105.1; 370/109
[58] Field of Search ............................. 375/8, 122, 220; 370/24.29, 95.1, 105.1, 109; 455/54.1, 54.2, 56.1

[56] References Cited

U.S. PATENT DOCUMENTS

| | | |
|---|---|---|
| 4,161,719 | 7/1979 | Pirikh et al. . |
| 5,124,985 | 6/1992 | Hoshikawa .............................. 370/95.3 |
| 5,200,962 | 4/1993 | Kao et al. ............................ 375/122 X |
| 5,260,977 | 11/1993 | Kinoshita .............................. 375/122 X |

FOREIGN PATENT DOCUMENTS 2005965  4/1979  United Kingdom .

OTHER PUBLICATIONS

Article published in IEEE Network: "The ISO Reference Model Entities" Recommendation V.42Bis, Geneva 1989.

*Primary Examiner*—Stephen Chin
*Assistant Examiner*—Bryan E. Webster
*Attorney, Agent, or Firm*—Laubscher & Laubscher

[57] ABSTRACT

A first frame produced by a first terminal is compressed after suppressing certain of the data fields forming it, then transmitted via a safe link through a transmission network into a second frame. This second frame received by a second terminal via the safe link is unpacked-from the fields relating to this safe link, whereupon the remainder of the frame is decompressed. The data fields suppressed for transmission by the first terminal are restored, either by calculation (for example, in the case of a frame checking sequence), or by insertion of a given word (for example, for each flag between frames). This data compressing and decompressing method is carried out in a data circuit-terminating equipment for a synchronous terminal.

6 Claims, 2 Drawing Sheets

DATA COMPRESSION-DECOMPRESSION METHOD AND APPARATUS FOR SYNCHRONOUS TERMINAL MEANS

BACKGROUND OF THE INVENTION

1. Field of the Invention

The present invention relates generally to the data compression-decompression field.

2. Description of the Prior Art

The advent of powerful data compression-decompression algorithms and the advantages resulting therefrom in terms of transmission line occupancy rate have involved the CCITT (International Telegraph and Telephone Consultative Committee) in defining, during the year 1989, a data compression recommendation for data circuit-terminating equipment (DCE) employing error correction procedures. This recommendation, designated as Recommendation V.42bis, Geneva 1989, is limited to the asynchronous, or more exactly, arhythmic transmission mode.

According to this recommendation, a data terminal equipment DTE, or terminal, is connected to a transmission network via a data circuit-terminating equipment DCE, or modem. The data terminal equipment DTE transmits characters in asynchronous mode to the data circuit-terminating equipment DCE. The characters are compressed as and when received by a V.42 bis modem, then grouped and packed to form a frame with safe link. This frame is then transmitted in the transmission network.

Thus the V.42bis recommendation does not consider the case of transmission from the terminal equipment in synchronous mode. In the case of such a transmission, the data produced by the terminal equipment are no longer arhythmic characters, but more sophisticated frames.

Thus, prior to this invention there remained the need for data circuit-terminating equipment enabling data compression for terminal equipment in synchronous mode.

OBJECTS OF THE INVENTION

The main object of this invention is to meet the aforesaid requirement by providing a synchronous frame compression-decompression method.

Another object of the invention is to provide a method in which the size of frame data to be compressed is as low as possible.

Still other object of the invention is to provide a data circuit-terminating equipment for carrying out this method. This terminating equipment performs both data compression and safe link functions for synchronous frames.

SUMMARY OF THE INVENTION

Accordingly, a method for on the one hand compressing first data frames which are derived by a first synchronous terminal equipment into respective second data frames which are transmitted through a transmission network towards a second synchronous terminal equipment and on the other hand decompressing said second transmitted data frames into said first data frames which are received by said second synchronous terminal equipment, said first and second data frames consisting of several data fields, said method comprising the following steps:

a) for each of the first data frames derived by said first synchronous terminal equipment, successively:

a1) suppressing at least one first data field from said each of the first data frames thereby forming a first reduced data frame, a2) compressing data of at least one field in said first reduced data frame thereby forming a first compressed reduced data frame, and a3) adding at least one second data field to said first compressed reduced data frame thereby forming a transmitted second data frame which is transmitted through said transmission network towards said second synchronous terminal equipment, and b) for said transmitted second data frame which is transmitted through said transmission network, successively:

b1) suppressing said at least one second data field from said second data frame thereby restoring said first compressed reduced data frame, b2) decompressing said first compressed reduced data frame thereby restoring said first reduced data frame, and b3) adding said at least one first data field to said first reduced data frame restored thereby restoring said each of said first data frames which is received by said second synchronous terminal equipment.

According to an important feature of the invention, especially for the first HDLC type frames, said each of the first data frames comprises successively an opening flag field, an address field, a control field, an information field, a frame checking sequence field and a closing flag field, said at least one first data field is at least one of said opening flag, frame check sequence and closing flag fields, and the method further comprises between said decompressing and adding steps a frame checking sequence computating step depending on said first reduced data frame.

According to a first embodiment, said at least one first data field in said first reduced data frame is at least one of fields amongst address, control and information fields in said each of the first data frames. According to a second embodiment, said at least one first data field in said first reduced data frame is an information field in said each of the first data frames, and wherein address and control fields in said first reduced data frame are not compressed.

According to another aspect of the invention, a data circuit-terminating equipment for compressing first data frames to be transmitted from a first terminal equipment to a network towards a second terminal equipment and decompressing received second data frames received from said network and to be transmitted towards said first terminal equipment, comprises (a) transmitting means including:

means for storing each of said first data frames transmitted from said first terminal equipment into a first stored data frame, means for suppressing at least one first data field in said first stored data frame thereby deriving a first reduced data frame, means for compressing said first reduced data frame into a first compressed reduced data frame, and safe transmitting means for adding at least one second data field to said first compressed reduced frame into a transmitted second frame to be transmitted through said network towards said second terminal equipment, and (b) receiving means including:

safe receiving means for suppressing said at least one received second field in each of second data frames received from said network thereby restoring a first compressed reduced data frame, means for decompressing said first compressed reduced data frame restored into a first reduced data frame, and means for adding said at least one first field to said first reduced data frame restored thereby restoring a first data frame to be transmitted to said first terminal equipment.

BRIEF DESCRIPTION OF THE DRAWINGS

Further features and advantages of the present invention will appear more clearly from reading the following description with reference to the corresponding accompanying drawings in which.

DESCRIPTION OF THE PREFERRED EMBODIMENTS

Figure 1:
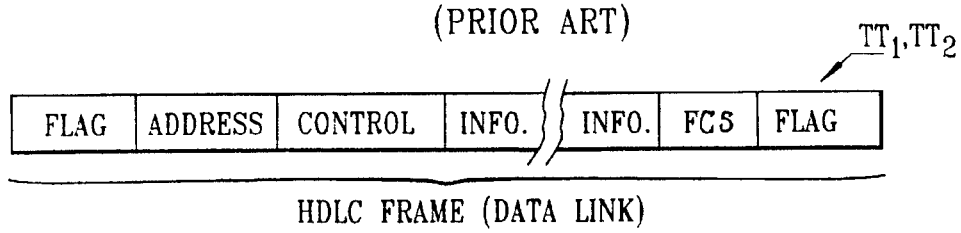
FIG. 1 shows a typical format of a synchronous frame carried by a data link between two data terminal equipments according to the prior art.

Referring to FIG. 1, a typical frame format such as LAPD frame (I.S.D.N.) or LAPB frame (X.25 packet network), according to the HDLC (High-Level Data Link Control) standard defined by the ISO (International Organization for Standardization), typically comprises opening flag, address, control, information, frame checking sequence (FCS) and closing flag fields transmitted according to this order. This frame format corresponds to the one required by the HDLC data link level, provided for the safe exchange of frames between two layer 2 (link) entities, layer 2 defined in the OSI reference model specified by the ISO. This layer 2 or data link level amongst other things performs the following functions:

delimitation by flags;

regulation of the orderly exchange of data;

detection of transmission errors; and flow checking.

In the frame format shown in FIG. 1 in which the information field comprises the useful information to be transmitted supplied by/to the layers above layer 2, the flag, address, control and frame checking sequence fields have the following functions.

The opening and closing flag fields are used between two level-2 layers of any two equipments for frame delimitation. The address field identifies the data link in which the frames are transmitted or received, thus differentiating between different links set up. The control field contributes to check the orderly exchange of the frames, i.e., the distinction between frames. Finally the frame checking sequence field is used to detect frame transmission errors and is, for example, obtained by polynomial encoding of some or all of the other fields of the frame.

Figure 2:
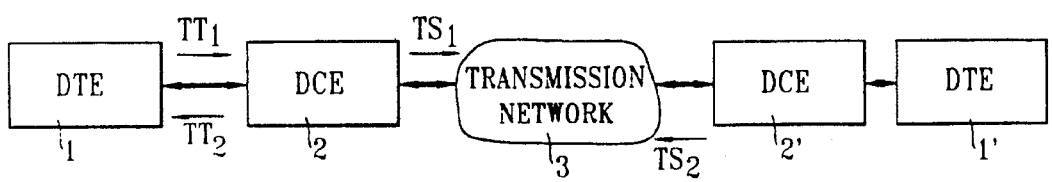
FIG. 2 shows the component parts of a transmission line between two data terminal equipments.

Referring to FIG. 2, a transmission line between two data terminal equipments DTE or separate terminals, 1 and 1', typically comprises from equipment 1 to equipment 1' a data circuit-terminating equipment DCE 2 and a transmission network 3, and another DCE equipment 2'.

According to the prior art, for a given transmission network and for asynchronous terminal equipments 1 and 1', respective terminating equipments 2 and 2' meeting recommendation V.42bis are used to compress data transmitted by the two terminal equipments 1 and 1' in network 3. The layer 2 (Link), relating to the ISO's OSI reference model, is only "integrated" in terminating equipments 2 and 2'. For each one of the two terminal equipments, such as equipment 1, the asynchronous characters are transmitted by terminal equipment 1 to terminating equipment 2. These characters are regrouped and compressed in equipment 2 to form an information field. Then, still by means of terminating equipment 2, the information field is "packed" by fields relating to a "Link" layer safe transmission to be transmitted in transmission network 3 into frames such as those shown in FIG. 1. On receive, in the terminating equipment, such as equipment 2', each information field compressed and "packed" is "unpacked" by a Link layer and the remaining information field is decompressed so as to restore the asynchronous characters to the terminal equipment 1'.

In the above, the PAD (packet assembler-disassembler) function has been left out as it is assumed that this is known to those skilled in the art within the context of asynchronous terminal accesses to an X.25 network.

According to the present invention, the compression operation cannot be performed as described above given that the terminal equipments 1 and 1' are of synchronous type. There is no longer arhythmic characters that are transmitted by terminal equipments 1 and 1' but frames, for example, with HDLC format Within the scope of the invention, terminal equipments 1 and 1' integrate a Link layer. A terminating equipment 2 or 2' meeting the V.42bis Recommendation cannot be used directly, and a compression method of data, i.e. frames, is established notably in view of optimizing the data compression rate by considering that this method is applied to frames and not to asynchronous characters. In this context the terminating equipments 2 and 2' include specific frame processing steps when transmitting and receiving.

It should be observed that the main aim of this data compression is to procure a considerable gain for the user in terms of the occupancy rate of the links that he uses.

Figure 3:
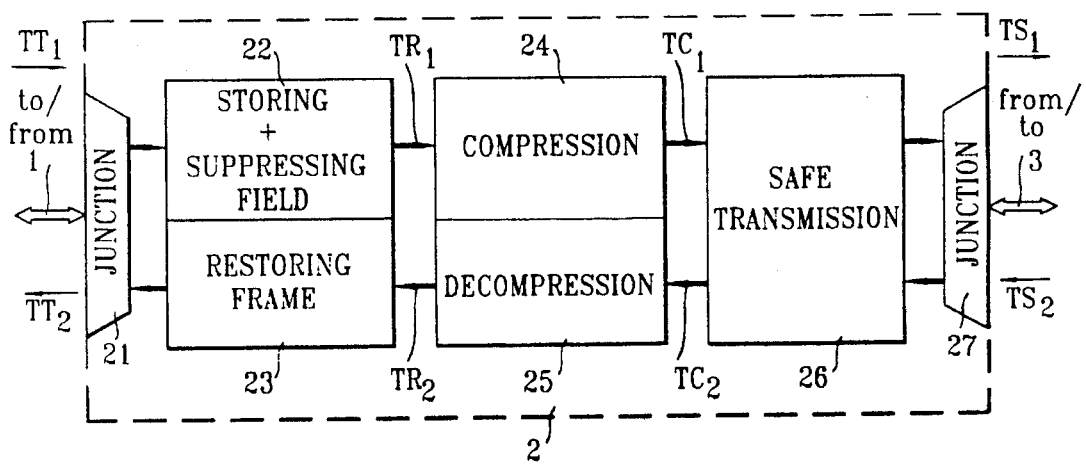
FIG. 3 is a block diagram of a data circuit-terminating equipment embodying the invention shown in FIG. 2.

Referring to FIG. 3, a DCE terminating equipment such as equipment 2 comprises, as embodied by the invention, two junctions 21 and 27 respectively associated to a bidirectional line connecting it to data terminal equipment 1 and to a bidirectional transmission line connecting it to network 3. The links set up between terminating equipment 2, and firstly, terminal equipment 1, and secondly, network 3, are for example of the full-duplex type (simultaneous transmission in both directions).

For transmission to network 3, terminating equipment 2 comprises field storing and suppressing means 22, compressing means 24 and safe transmitting means 26 which are cascade-connected. For receiving from network 3, terminating equipment 2 comprises safe transmitting means 26, decompressing means 25 and frame restoring means 23 which are cascade-connected.

Each first frame $TT_1$, for example with HDLC format, produced by terminal equipment 1 and to be transmitted in the form of a transmitted second frame $TS_1$ via network 3, is received by the junction 21 forming an interface with the line connecting terminal equipment 1 and terminating equipment 2. Although shown in the form of a functional block diagram, terminating equipment 2 embodying the invention forms a telecommunication interface and is assembled on the basis of a microprocessor. Means 22 provide a storing of each first frame $TT_1$ received via junction 21. Notably these storing means 22 detect the opening flag and closing flag in each frame $TT_1$ so as to store all the four fields of the frame comprised between these two flags in a buffer memory. The buffer memory thus stores for each stored frame $TT_1$, an address field, a control field, an information field and a frame checking sequence field, and the two flag fields are suppressed.

A check for correct transmission between terminal equipment 1 and terminating equipment 2 is achieved for the stored frames. This check consists in comparing, for each frame stored, the data of the frame checking sequence field FCS with the data of other stored fields of frame $TT_1$ previously encoded according to an error checking encoding identical to the encoding achieved by the "Link" layer in terminal equipment 1. If this comparison provides a positive result, then the frame checking sequence FCS field is suppressed in frame $TT_1$ so as to form a first reduced frame $TR_1$. In the opposite case, the erroneous frame $TT_1$ is not processed by the compressing means 24. On a positive comparison the frame checking sequence field is suppressed so as to achieve one of the main objects of the invention consisting in reducing as far as possible the size of the data to be compressed in the safe link frame (detection of errors, frame delimitation, etc.) between the two equipments 2 and 2' (FIG. 2). After certain fields of the reduced frame $TR_1$ have been compressed, as explained below, by means 24 into a first compressed reduced frame $TC_1$, it is necessary to constitute, from the latter, a safe compressed reduced frame, so-called transmitted second frame $TS_1$, carrying the flag delimitation, sequence checking, error checking, flow checking, etc . . . functions, as defined by the setting up of a safe link, for a safe transmission through network 3. Also added by means 26 to said first compressed reduced frame $TC_1$ are a frame checking field computed from the fields of the compressed reduced frame $TC_1$, and the flag fields. The "0"-state-bit inserting procedure, specific to the HDLC standard, avoiding the reproduction of the flag format by the user data INFO, is also carried out in means 26. Assumed to be known by those skilled in the art, this procedure will not be described in further detail hereafter.

According to a first alternative of the invention after suppressing the flag and frame checking sequence fields in an initial HDLC frame $TT_1$ into a reduced frame $TR_1$, the compressing means 24 compresses the data in all the remaining fields, i.e. the address, control and information fields, in the reduced frame so as to form a compressed reduced frame $TC_1$.

According to a second alternative of the invention, the address and control fields are transmitted as such in network 3 via safe transmitting means 26 without being compressed° In this case only the data in the information field INFO in frame $TR_1$ are compressed. This second alternative results from a consideration inherent in the known adaptative compression methods. In fact, according to these compression methods, two identical dictionaries are associated to the compressing means and to the decompressing means, respectively. These dictionaries are updated as a function of the data to be compressed, and code words are respectively associated with character strings in the data received. Thus, in view of the dictionary's size limitation, only the character strings most frequently transmitted allow to obtain substantial compression rates. Now by their very nature the address and control fields contain data which offer no similarity from one frame to the next. This is the reason for which the control and address fields can be transmitted without compression.

After compression of the data in certain fields according to the two alternatives described above, these compressed, or compressed and non-compressed, data, are transmitted in the form of safe compressed reduced frames, so-called transmitted second frames $TS_1$, in network 3 via safe transmitting means 26 and junction 27. More exactly the safe transmissing means 26 receive, for each initial HDLC frame $TT_1$, the compressed, or compressed and non-compressed, data of the address, control and information fields according to the two alternatives described above, and form a transmitted second frame $TS_1$ comprising delimitation flag fields, a second-frame checking sequence field, a data link identification field, etc., which enframe the compressed data, or compressed and non-compressed data, of these address, control and information fields, as illustrated by the cross-hatched fields CO in the center of FIG. 8. Frame $TS_1$ is transmitted by junction 27 providing the interface with the transmission line of network 3.

An upper part of the time chart in FIG. 8 schematizes all the processing performed on transmission by means 22, 24 and 26 of the data circuit-terminating equipment 2 as embodied by the invention, for a frame in HDLC format $TT_1$ transmitted by terminal equipment 1 and converted successively into frames $TR_1$, $TC_1$ and $TS_1$. Frames $TS_1$ transmitted between two terminating equipments 2 and 2' comprise, firstly, compressed fields, or compressed and non-compressed fields, and secondly, fields relating to the safe link set up between the respective safe transmitting means 26 in the two equipments 2 and 2'.

Referring again to FIG. 8, the operation of equipment 2 in receive mode as embodied by the invention is now described, assuming that terminating equipment 2' transmits in network 3 second frames $TS_2$ to terminal equipment 2. On receive mode in equipment 2 the safe transmitting means 26, the decompressing means 25 and the frame restoring means 23 are used.

The safe transmitting means 26 receive via junction 27 the received second safe compressed reduced frames $TS_2$ transmitted by equipment 2' (FIG. 8) whereof certain non-compressed fields relate, amongst other things, to the safe data link set up between the safe transmitting means in equipment 2' and the safe transmitting means 26 in equipment 2. On receive, the safe transmitting means 26 achieve error checking, second frames delimiting, second frame sequence checking, flow checking, etc . . . operations. Those skilled in the art will appreciate that the safe link set up between the safe transmitting means in the two equipments 2' and 2 depends on the protocol selected at link level. Various known standards or recommendations at link level (level 2 of the OSI reference model) can be chosen to carry out this protocol.

After all the processings relating to the safe link have been performed with possible transmission repetitions of received second frames $TS_2$ in the case of error detection, the frames $TS_2$ are "unpacked" from the fields depending on the safe transmission to form received first compressed reduced frames $TC_2$. All the compressed fields for transmission are applied through the output port of the safe transmitting means 26 to the input port of the decompressing means 25 so as to be decompressed into received first reduced frames $TR_2$ including address, control and information fields as transmitted initially by terminal equipment 1'.

It is then necessary to reform a received frame $TT_2$ compatible with the Link level of terminal equipment 1. This is the task of the frame restoring means 23. It is recalled that on transmission, both the "first" opening flag, closing flag and frame check sequence fields are suppressed by means 22. Thus the frame restoring means 23 repack the data of the address, control and information fields by frame opening and closing flags and a frame checking sequence so as to provide a received first frame compatible with the Link level of terminal equipment 1. The frame checking sequence FCS is recomputed as from the address, control and information fields of decompressed frame TR$_2$ produced from output of decompressing means 25.

It should be noted that this recomputed frame checking sequence does not take part in detection of errors due to the transmission through network 3, given that it is suppressed on transmission in equipment 2' and recomputed on receive in equipment 2. Nevertheless, this double operation guarantees the transparency of equipments 2 and 2' with regard to terminal equipments 1 and 1'.

Figure 4:
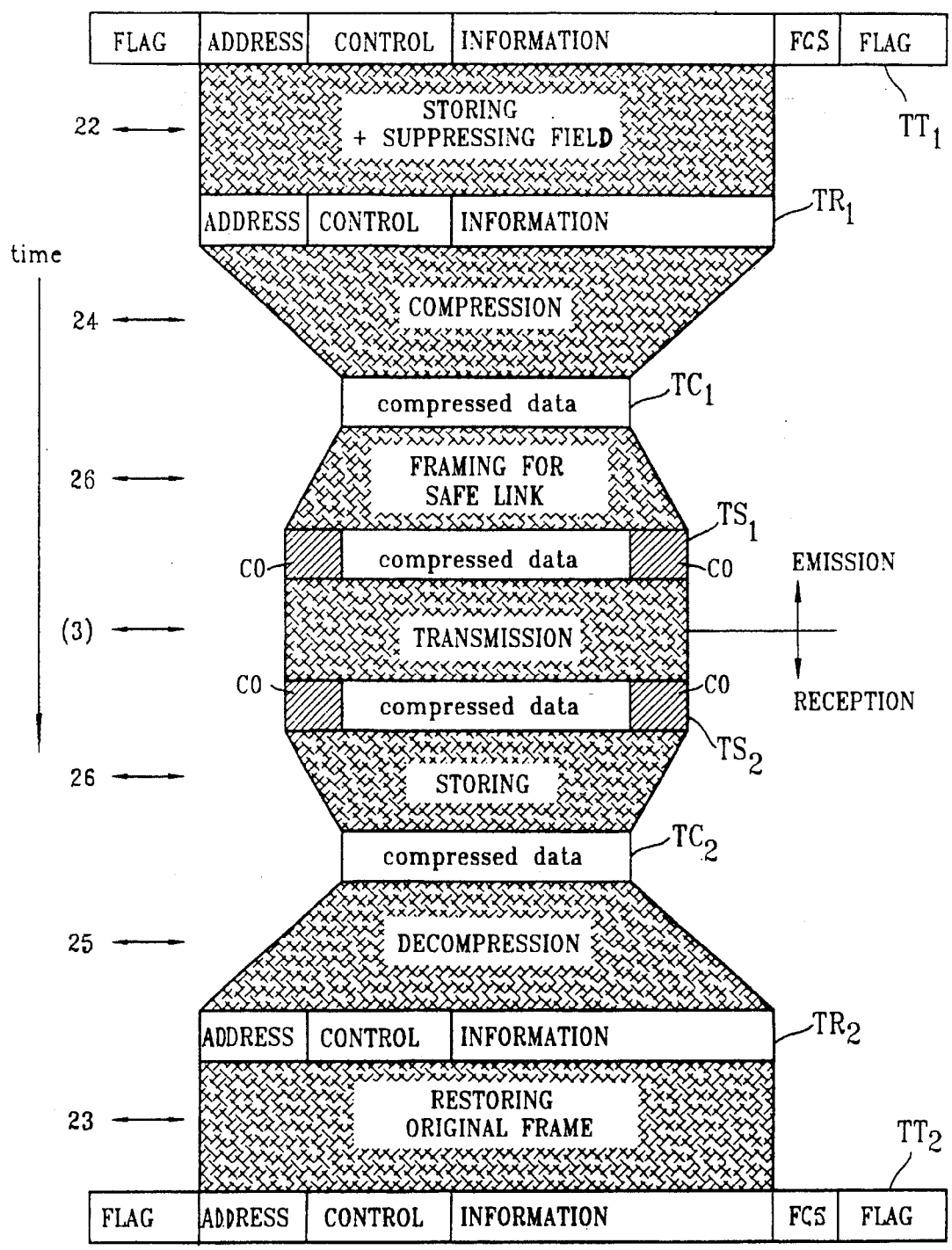
FIG. 4 is a time chart schematizing various method steps of data transmission and reception carried out by the data circuit-terminating equipment embodying the invention shown in FIG. 3.

The lower part of the time chart in FIG. 4 summarizes the processing of a received frame TS$_2$ which is received in terminating equipment 2 described above and which is converted successively into frames TC$_2$, TR$_2$ and TT$_2$.

What is claimed is:

1. A data circuit-terminating system for compressing first data frames (TT$_1$) into transmitted second data frames (TS$_1$) to be transmitted from first synchronous terminal means (1) via a network toward a second synchronous terminal means (1'), and decompressing received second data frames (TS$_2$) received from said network and to be transmitted to said first terminal means, said first data frames including an opening flag field, an address field, a control field, an information field, a frame checking sequence field, and a closing flag field, comprising:

(a) transmitting means including:

(1) means (22) for storing each of said first data frames (TT$_1$) transmitted from said first terminal means into a first stored data frame, and for suppressing at least one of said opening flag, frame checking sequence and closing flag fields contained in said first stored data frame, thereby deriving a first reduced data frame (TR$_1$), (2) means (24) for compressing said first reduced data frame into a first compressed reduced data frame (TC$_1$), and (3) safe transmitting means (26) for adding to said first compressed reduced frame a frame checking field based on said first compressed reduced data frame (TR$_1$) and on said flag fields, thereby to form a transmitted second frame (TS$_1$) to be transmitted through said network toward said second terminal means, and (b) receiving means including:

(1) safe receiving means (26) for storing and suppressing at least one said second data field in each of the received second frames (TS$_2$) received from said network, thereby restoring a first compressed reduced data frame (TC$_2$), (2) means (25) for decompressing said first compressed reduced data frame restored into a first reduced data frame (TR$_2$), (3) means for producing a frame checking sequence field (FCS) from the address, control and information fields of said decompressed reduced frame (TR$_2$); and (4) means for repacking the address, control and information fields of said first reduced data frame (TR$_2$) by said frame checking sequence field and by said opening and closing flag fields to produce said first data frame (TT$_2$).

2. A method for compressing first data frames (TT$_1$) derived by first synchronous terminal means (1) into respective second data frames (TS$_1$) which are transmitted through a transmission network (3) toward second synchronous terminal means (1'), and for decompressing said second transmitted data frames TS$_2$ which are received by said second synchronous terminal means into said first data frames, said first data frames including an opening flag field, an information field, a frame checking sequence field, and a closing flag field, comprising:

(a) for each of the first data frames (TT$_1$) derived by said first synchronous terminal means (1), successively:

(1) storing and suppressing at least one of said opening flag, frame checking sequence and closing flag fields to form a first reduced data frame (TR$_1$);

(2) compressing data of at least one of the fields remaining in said first reduced frame to form a first compressed reduced data frame (TC$_1$); and (3) adding to said first compressed reduced data frame a frame checking field based on said first compressed reduced data frame (TR$_1$) and on said flag fields, thereby to form a transmitted second data frame (TS$_1$) which is transmitted through said transmission network toward said second synchronous terminal means; and (b) for said received second data frame (TS$_2$) successively:

(1) storing and suppressing at least one second data field from said received second data frame, thereby to restore said first compressed reduced data frame (TC$_2$);

(2) decompressing said first compressed reduced data frame to restore said first reduced data frame (TR$_2$);

(3) producing a frame checking sequence field (FCS) from the address, control and information fields of said decompressed reduced frame (TR$_2$); and p2 (4) repacking the address, control and information fields of said first reduced data frame (TR$_2$) by said frame checking sequence field and by said opening and closing flag fields to produce said first data frame (TT$_2$).

3. The method as claimed in claim 2, wherein said first and second synchronous terminal means each transmit and receive first data frames in a full-duplex mode.

4. The method as claimed in claim 2, wherein said first data field in said first reduced data frame is an information field in said each of the first data frames, and further wherein said first reduced data frame includes address and control fields that are not compressed.

5. The method as claimed in claim 2, wherein said second data frame further includes flag and error checking sequence fields specific to said second data frames.

6. The method defined in claim 2, wherein each of said first data frames includes address, control and information frames, and further wherein said first data field in said first reduced data frame comprises at least one of the address, control and information fields of said first data frames.

* * * * *